US010091269B2

(12) United States Patent
Swaminathan et al.

(10) Patent No.: US 10,091,269 B2
(45) Date of Patent: *Oct. 2, 2018

(54) BUFFERING IN HTTP STREAMING CLIENT

(71) Applicant: Adobe Systems Incorporated, San Jose, CA (US)

(72) Inventors: Viswanathan Swaminathan, Saratoga, CA (US); Saayan Mitra, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,547

(22) Filed: Jun. 16, 2015

(65) Prior Publication Data
US 2015/0281298 A1 Oct. 1, 2015

Related U.S. Application Data

(63) Continuation of application No. 13/541,508, filed on Jul. 3, 2012, now Pat. No. 9,276,989.
(Continued)

(51) Int. Cl.
*G06F 15/16* (2006.01)
*H04L 29/08* (2006.01)
(Continued)

(52) U.S. Cl.
CPC .......... *H04L 67/02* (2013.01); *H04L 65/4084* (2013.01); *H04L 65/4092* (2013.01);
(Continued)

(58) Field of Classification Search
CPC . H04L 65/4084; H04L 65/4092; H04L 67/02; H04N 21/23608; H04N 21/23611; H04N 21/23895
See application file for complete search history.

(56) References Cited

U.S. PATENT DOCUMENTS

| 6,072,832 A * | 6/2000 | Katto ................ G09G 5/00 348/39 |
| 6,591,058 B1 * | 7/2003 | O'Connor ............ G11B 27/034 386/248 |

(Continued)

FOREIGN PATENT DOCUMENTS

EP 0705042 9/1995

OTHER PUBLICATIONS

"Open Source Media Framework", retrieved from <http://www.osmf.org> on Dec. 6, 2012, 1 page.
(Continued)

*Primary Examiner* — Moustafa M Meky
*Assistant Examiner* — Blake J Rubin
(74) *Attorney, Agent, or Firm* — Wolfe-SBMC

(57) ABSTRACT

A buffer model in an HTTP streaming client may include receiving a first content fragment of a first content stream in response to a first HTTP request. It may also include receiving a second content fragment of a second content stream in response to a second HTTP request. The buffer model may further include storing the first and second content fragments in first and second buffers of a plurality of configurable buffers. The first and second content fragments may be multiplexed into a third buffer of the plurality of buffers. The multiplexed first and second content fragments may be stored in a fourth buffer of the plurality of buffers for playback. The buffer model may be implemented by an application. The buffers may be designed based on one or more constraints.

20 Claims, 10 Drawing Sheets

Related U.S. Application Data

(60) Provisional application No. 61/618,455, filed on Mar. 30, 2012.

(51) Int. Cl.
  *H04N 21/236* (2011.01)
  *H04N 21/2389* (2011.01)
  *H04L 29/06* (2006.01)

(52) U.S. Cl.
  CPC . *H04N 21/23608* (2013.01); *H04N 21/23611* (2013.01); *H04N 21/23895* (2013.01)

(56) References Cited

U.S. PATENT DOCUMENTS

| | | | | |
|---|---|---|---|---|
| 6,678,223 B2* | 1/2004 | Tobita | ............. | G11B 7/007 369/47.22 |
| 6,678,332 B1* | 1/2004 | Gardere | ............. | H04N 21/23424 348/705 |
| 6,704,281 B1* | 3/2004 | Hourunranta | ............. | H04N 7/52 370/230 |
| 6,792,047 B1* | 9/2004 | Bixby | ............. | H04N 21/23424 375/240.26 |
| 6,993,604 B2 | 1/2006 | Dixon | | |
| 7,009,997 B2 | 3/2006 | Huang et al. | | |
| 7,023,924 B1* | 4/2006 | Keller | ............. | H04N 21/23424 375/240.26 |
| 7,054,911 B1* | 5/2006 | Lango | ............. | H04L 29/06027 709/213 |
| 7,071,944 B2* | 7/2006 | MacInnis | ............. | G06T 9/007 345/502 |
| 7,096,481 B1* | 8/2006 | Forecast | ............. | H04N 21/23406 348/E5.008 |
| 7,116,894 B1* | 10/2006 | Chatterton | ............. | H04N 5/765 348/512 |
| 7,263,187 B2* | 8/2007 | Pedlow, Jr. | ............. | H04N 7/17318 348/E5.008 |
| 7,496,675 B2 | 2/2009 | Obata et al. | | |
| 7,581,043 B2 | 8/2009 | Dixon | | |
| 7,729,391 B2* | 6/2010 | Miyaji | ............. | H04N 21/2368 370/537 |
| 7,783,773 B2* | 8/2010 | Wu | ............. | H04L 65/4069 709/203 |
| 8,194,707 B2 | 6/2012 | Chen | | |
| 8,402,280 B1* | 3/2013 | Shi | ............. | G06F 21/10 713/189 |
| 8,922,665 B2* | 12/2014 | Cooper | ............. | H04N 1/00204 348/14.12 |
| 9,276,989 B2 | 3/2016 | Swaminathan et al. | | |
| 9,319,733 B2* | 4/2016 | Plourde, Jr. | ............. | H04N 21/4147 |
| 2001/0031008 A1* | 10/2001 | Segawa | ............. | H04N 21/2368 375/240.26 |
| 2002/0009149 A1* | 1/2002 | Rodriguez | ............. | H04N 21/25808 375/240.25 |
| 2003/0169929 A1* | 9/2003 | Kohiyama | ............. | G06T 1/60 382/233 |
| 2004/0190608 A1* | 9/2004 | Takahashi | ............. | H04N 21/23406 375/240.01 |
| 2004/0193762 A1* | 9/2004 | Leon | ............. | H04L 29/06027 710/52 |
| 2004/0233996 A1* | 11/2004 | Jung | ............. | G11B 20/10527 375/240.26 |
| 2005/0021830 A1* | 1/2005 | Urzaiz | ............. | H04L 47/10 709/234 |
| 2005/0036495 A1* | 2/2005 | Wishneusky | ............. | H04L 12/5693 370/395.4 |
| 2005/0190794 A1* | 9/2005 | Krause | ............. | H04L 29/06027 370/485 |
| 2005/0213941 A1* | 9/2005 | Taira | ............. | G11B 20/1217 386/240 |
| 2005/0244138 A1* | 11/2005 | O'Connor | ............. | G11B 27/034 386/298 |
| 2006/0120282 A1* | 6/2006 | Carlson | ............. | H04L 12/2602 370/229 |
| 2006/0184697 A1* | 8/2006 | Virdi | ............. | H04L 47/26 709/248 |
| 2007/0097257 A1* | 5/2007 | El-Maleh | ............. | H04N 21/23406 348/419.1 |
| 2007/0102764 A1* | 5/2007 | Ando | ............. | G11B 20/00086 257/355 |
| 2007/0147782 A1* | 6/2007 | Shibata | ............. | G11B 27/105 386/230 |
| 2007/0177466 A1* | 8/2007 | Ando | ............. | G11B 27/105 369/13.01 |
| 2008/0013562 A1* | 1/2008 | Fujinami | ............. | H04N 21/2368 370/429 |
| 2008/0086434 A1* | 4/2008 | Chesla | ............. | G06N 5/048 706/12 |
| 2008/0114894 A1* | 5/2008 | Deshpande | ............. | H04L 65/608 709/237 |
| 2008/0117937 A1* | 5/2008 | Firestone | ............. | H04N 5/4401 370/503 |
| 2008/0195761 A1* | 8/2008 | Jabri | ............. | H04L 65/605 709/250 |
| 2008/0256254 A1* | 10/2008 | Kim | ............. | H04N 21/2381 709/231 |
| 2008/0267590 A1* | 10/2008 | Otsuka | ............. | H04N 19/127 386/354 |
| 2009/0022172 A1* | 1/2009 | Haberman | ............. | H04N 21/23424 370/429 |
| 2009/0254657 A1* | 10/2009 | Melnyk | ............. | H04L 47/10 709/224 |
| 2010/0011117 A1* | 1/2010 | Hristodorescu | ............. | H04N 7/24 709/231 |
| 2010/0135637 A1 | 6/2010 | McDermott et al. | | |
| 2010/0161825 A1* | 6/2010 | Ronca | ............. | H04N 21/23424 709/231 |
| 2010/0218231 A1* | 8/2010 | Frink | ............. | H04N 7/17318 725/118 |
| 2010/0220979 A1* | 9/2010 | Ryu | ............. | G11B 7/00736 386/239 |
| 2010/0231599 A1* | 9/2010 | Tung | ............. | G06T 11/40 345/522 |
| 2011/0019976 A1* | 1/2011 | Park | ............. | H04N 5/76 386/294 |
| 2011/0096828 A1* | 4/2011 | Chen | ............. | H04N 21/23106 375/240.02 |
| 2011/0106969 A1* | 5/2011 | Choudhury | ............. | H04N 21/41407 709/236 |
| 2011/0150099 A1* | 6/2011 | Owen | ............. | H04N 21/23406 375/240.26 |
| 2011/0225302 A1* | 9/2011 | Park | ............. | H04L 65/4084 709/227 |
| 2011/0307623 A1* | 12/2011 | George | ............. | H04L 65/4084 709/231 |
| 2012/0004960 A1* | 1/2012 | Ma | ............. | G06Q 30/0241 705/14.4 |
| 2012/0117261 A1* | 5/2012 | Bouazizi | ............. | H04L 65/1069 709/231 |
| 2012/0141089 A1* | 6/2012 | Hunt | ............. | H04N 21/23439 386/239 |
| 2012/0151009 A1* | 6/2012 | Bouazizi | ............. | H04L 41/5067 709/219 |
| 2012/0265853 A1* | 10/2012 | Knox | ............. | H04N 21/2187 709/218 |
| 2012/0284802 A1* | 11/2012 | Hierro | ............. | G06F 21/10 726/27 |
| 2012/0297430 A1* | 11/2012 | Morgos | ............. | H04L 65/4084 725/88 |
| 2012/0311075 A1* | 12/2012 | Pantos | ............. | H04N 21/4825 709/217 |
| 2012/0317308 A1* | 12/2012 | Penner | ............. | H04L 65/4092 709/239 |
| 2012/0331106 A1* | 12/2012 | Ramamurthy | ............. | H04N 21/234327 709/218 |
| 2013/0047074 A1* | 2/2013 | Vestergaard | ............. | G06F 3/14 715/234 |

(56) References Cited

U.S. PATENT DOCUMENTS

| | | | | |
|---|---|---|---|---|
| 2013/0086601 | A1* | 4/2013 | Adimatyam | H04N 21/23424 725/1 |
| 2013/0124749 | A1* | 5/2013 | Thang | H04L 65/4092 709/231 |
| 2013/0227102 | A1 | 8/2013 | Beck et al. | |
| 2013/0227158 | A1* | 8/2013 | Miller | H04L 65/60 709/231 |
| 2013/0262694 | A1 | 10/2013 | Swaminathan et al. | |
| 2013/0282868 | A1 | 10/2013 | Chung et al. | |
| 2013/0282871 | A1* | 10/2013 | Jung | H04L 65/60 709/219 |
| 2014/0270680 | A1* | 9/2014 | Bloch | G11B 27/11 386/201 |
| 2015/0156238 | A1* | 6/2015 | Cooper | H04N 1/00204 709/219 |

OTHER PUBLICATIONS

"Notice of Allowance", U.S. Appl. No. 13/541,508, dated Mar. 13, 2015, 10 pages.

"ETSI TS 126 247", V10.1.0, Jan. 2012, 114 pages.

"Series H: Audiovisual and Multimedia Systems: Infrastructure of Audiovisual Services—Transmission Multiplexing and Synchronization", retrieved from <http://www.itu.int/rec/T-REC-H.222.0>, May 27, 1999, 171 pages.

"HTTP Dynamic Streaming", HTTP Dynamic Streaming Data Sheet, Adobe Systems, Inc., Apr. 2010, 2 pages.

"MPEG The Moving Picture Experts Group (MPEG)", retrieved from <mpeg.chiarigilone.org>, Dec. 1, 2012, 2 pages.

"Smooth Streaming Overview", Microsoft Corporation, retrieved from <http://www.iis.net/download/SmoothStreaming> on Dec. 6, 2012, 3 pages.

"HTTP Live Streaming Overview", Apple, Inc., Apr. 1, 2011, 38 pages.

"Adobe Flash Video File Format Specification", Version 10.1, Adobe Systems Incorporated, Aug. 2010, 89 pages.

"Non-Final Office Action", U.S. Appl. No. 13/541,508, dated Oct. 14, 2014, 9 pages.

Akhshabi,"An Experimental Evaluation of Rate-Adaptation Algorithms in Adaptive Streaming over HTTP", IEEE International Conference on Multimedia Systems, 2011, pp. 157-168.

Bica,"An IP Multicast—HTTP Gateway for Reliable Streaming in Heterogeneous Networks", 8th IEEE International Conference on Communications (COMM), 2010, pp. 389-392.

De"An Experimental Investigation of the Akamai Adaptive Video Streaming", USAB WIMA, 2010, 18 pages.

Fielding,"Hypertext Transfer Protocol—HTTP/1.1", Network Working Group, Jun. 1999, 7 pages.

Kuschnig,"Evaluation of HTTP-based Request-Response Streams for Internet Video Streaming", MMSys '11, Feb. 23-25, 2011, San Jose, CA, Feb. 23, 2011, 12 pages.

Liu,"Parallel Adaptive HTTP Media Streaming", IEEE International Conference on Computer Communications and Networks (ICCCN), 2011, 6 pages.

Lohmar,"Dynamic Adaptive HTTP Streaming of Live Content", IEEE International Symposium on a World of Wireless, Mobile and Multimedia Networks (WoWMoM), 2011, 8 pages.

Stockhammer,"Dynamic Adaptive Streaming over HTTP-Design Principles and Standards", IEEE International Conference on Multimedia Systems, 2011, 3 pages.

Swaminathan,"Low Latency Live Video Streaming Using HTTP Chunked Encoding", 13th International IEEE Workshop on Multimedia Signal Processing (MMSP), 2011, 6 pages.

Van"On Media Delivery Protocols in the Web", IEEE International Conference on Multimedia and Expo (ICME), 2010, pp. 1028-1033.

Van"HTTP Adaptive Streaming with Media Fragment Uris", IEEE International Conference on Multimedia and Expo (ICME), 2011, 6 pages.

* cited by examiner

BUFFERING IN HTTP STREAMING CLIENT

PRIORITY INFORMATION

This application is a continuation of U.S. patent application Ser. No. 13/541,508, filed Jul. 3, 2012, which claims priority to U.S. Provisional Application Ser. No. 61/618,455, filed on Mar. 30, 2012, the disclosures of which are incorporated by reference herein.

BACKGROUND

HTTP (Hypertext Transfer Protocol) streaming has caught on in recent years as an efficient and simple streaming solution using existing infrastructure (e.g., HTTP caches and web servers). In HTTP streaming, combined video and audio is divided into small fragments, which are individually addressable by unique URLs. The client requests the small combined fragments of video and audio using an HTTP Request/Response mechanism. The downloaded fragments are then played back sequentially.

HTTP streaming may support live event streaming as well as adaptive streaming (e.g., switching to different bitrates of the stream according to available bandwidth). Moreover, HTTP streaming may provide a cheaper alternative to real-time streaming, which uses dedicated servers and cache.

Some media players may consume media in an interleaved format where the audio and video samples are interleaved in a time ordered fashion. Since audio and video can be fetched from different sources, there is a need to multiplex video and audio before sending the data to the player. Such multiplexing is performed by the servers. Moreover, in some instances, a number of supplementary audio streams may be supported for a single video sequence. One example of such an instance is to support multiple languages. For example, audio tracks may be available in English, French, Spanish, German, and Dutch for the same video program. In such instances, if an alternate track (e.g., different language track or different camera angle, etc.) has to be added to the media, then the content has to be repackaged (e.g., re-multiplexed) at the server. This entails duplication of the video to accommodate the new track. As a result, to cover the various possibilities of video/language combinations, the server must publish each of those combinations.

SUMMARY

Various embodiments of methods and apparatus for buffering in an HTTP streaming client are described. In one embodiment, a first content fragment of a first content stream may be received in response to a first HTTP request. A second content fragment of a second content stream may be received in response to a second HTTP request. The first and second content fragments may be stored in first and second buffers of a plurality of buffers. The first and second content fragments may be multiplexed into a third buffer of the plurality of buffers. The multiplexing may be performed by an application of a client device. The multiplexed first and second content fragments may be stored in a fourth buffer of the plurality of buffers for playback.

In one non-limiting embodiment, each of the plurality of buffers may be configurable in a threshold value and a buffer size. The threshold value may be usable by the buffer to determine when to request additional data. The buffers may be configured and modified in response to determined latency (e.g., live and/or switching) and/or jitter handling capacity.

Figure 1:
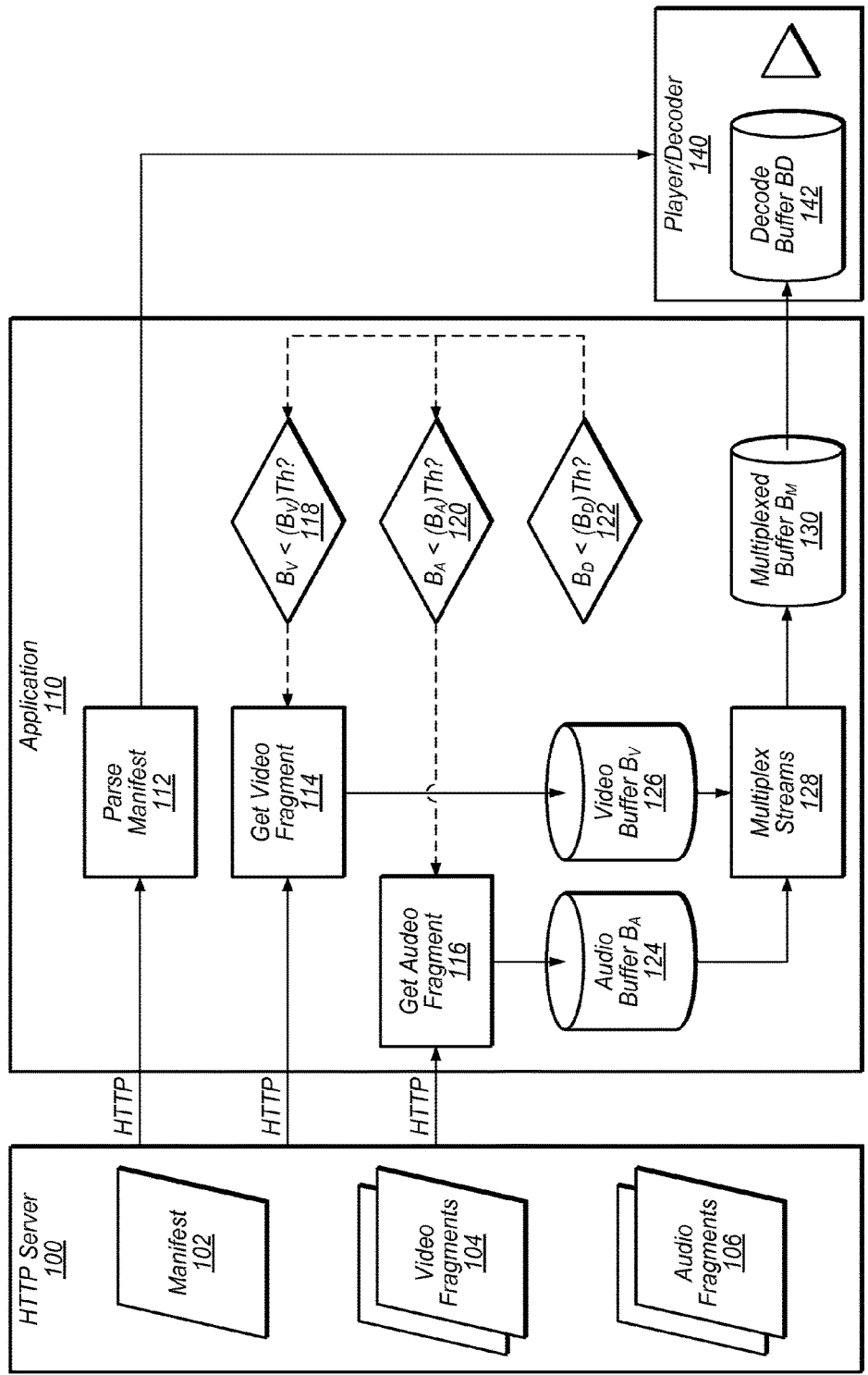
FIG. 1 illustrates data flow in an example HTTP streaming client system, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

"First," "Second," etc. As used herein, these terms are used as labels for nouns that they precede, and do not imply any type of ordering (e.g., spatial, temporal, logical, etc.). For example, the terms "first" and "second" content fragments can be used to refer to any two content fragments. In other words, the "first" and "second" sources are not limited to logical content fragments 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Various embodiments of methods and apparatus for implementing a client buffer model for an HTTP streaming client are described. Although many embodiments are described in terms of audio and video content, note that the disclosed techniques may use other types of content as well. Some embodiments may include a means for receiving content fragments, a means for storing the content fragments, a means for multiplexing the content fragments, and/or a means for storing the multiplexed content fragments for playback. For example, an application of a client device may receive content fragments, store the content fragments, multiplex the content fragments, and store the multiplexed content fragments for playback, as described herein. The application may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to implement the application configured to: receive content fragments, store the content fragments, multiplex the content fragments, and store the multiplexed content fragments for playback, as described herein. Other embodiments of the application may be at least partially implemented by hardware circuitry and/or firmware stored, for example, in a non-volatile memory.

Turning now to FIG. 1, data flow in an example implementation of the disclosed buffer model in an HTTP streaming system is illustrated. In the illustrated embodiment, the buffer model may include application 110 and player/decoder 140 as part of a same client device. The client device may be communicatively coupled (e.g., over the Internet, LAN, or other network) with HTTP server 100. In one embodiment, application 110 may be an application layer framework built on top of player/decoder 140 to serve as an HTTP streaming client.

In some embodiments, player/decoder 140 may request manifest 102, which includes the URLs of various content fragments that constitute an HTTP stream. HTTP server 100 may return manifest 102, which may be parsed by application 110 at parse manifest 112, which may then be provided to player/decoder 140. The data that is provided by HTTP server 100, in the form of video fragments 104 and audio fragments 106, is received by application 110 and stored in audio buffer 124 and video buffer 126, respectively. Note that HTTP server 100 may be a number of servers, which may be located at different locations. Thus, an audio fragment 106 and video fragment 104 may be located on different servers and not already packaged/multiplexed at HTTP server 100. The data from audio buffer 124 and video buffer 126 may then be multiplexed at multiplex streams 128 in application 110. The multiplexed data may then be stored in multiplexed buffer 130. Data from multiplexed buffer 130 may provide data to decode buffer 142 of player/decoder 140. In one embodiment, the data may be periodically pushed from multiplexed buffer 130 to decoder buffer 142 at a rate r. The data from decode buffer 142 may then be provided for decoding/playback.

As described herein, each of the buffers in the buffer model may include a threshold value. Whether and when to request/fetch additional may be based on the threshold value. For example, if the amount of data in video buffer 126 is less than the threshold for the video buffer, as shown at decision block 118, then get video fragment 114 may be performed resulting in an HTTP request for an additional video fragment 104. Similar decision blocks 120 and 122 are shown for the audio and decode buffers, respectively. A similar decision block (not shown) may also exist for multiplexed buffer to request additional data from one or more of its upstream buffers (audio buffer 124 and/or video buffer 126).

If too much data comes in too quickly (e.g., for a high bandwidth connection), it may use up computing cycles for multiplexing instead of rendering. Accordingly, in some embodiments, the rate r may be throttled, as described herein. Also, if switching to a different track, the data existing in the decoding buffer of the player may be fully played out resulting in delaying the manifestation of the switch. Network jitters also may be absorbed as much as they can for an optimal viewing experience. Further, in memory constrained devices, there may be a hard requirement on the size of the buffers, which may limit the maximum bitrate stream playable in the device.

Figure 2:
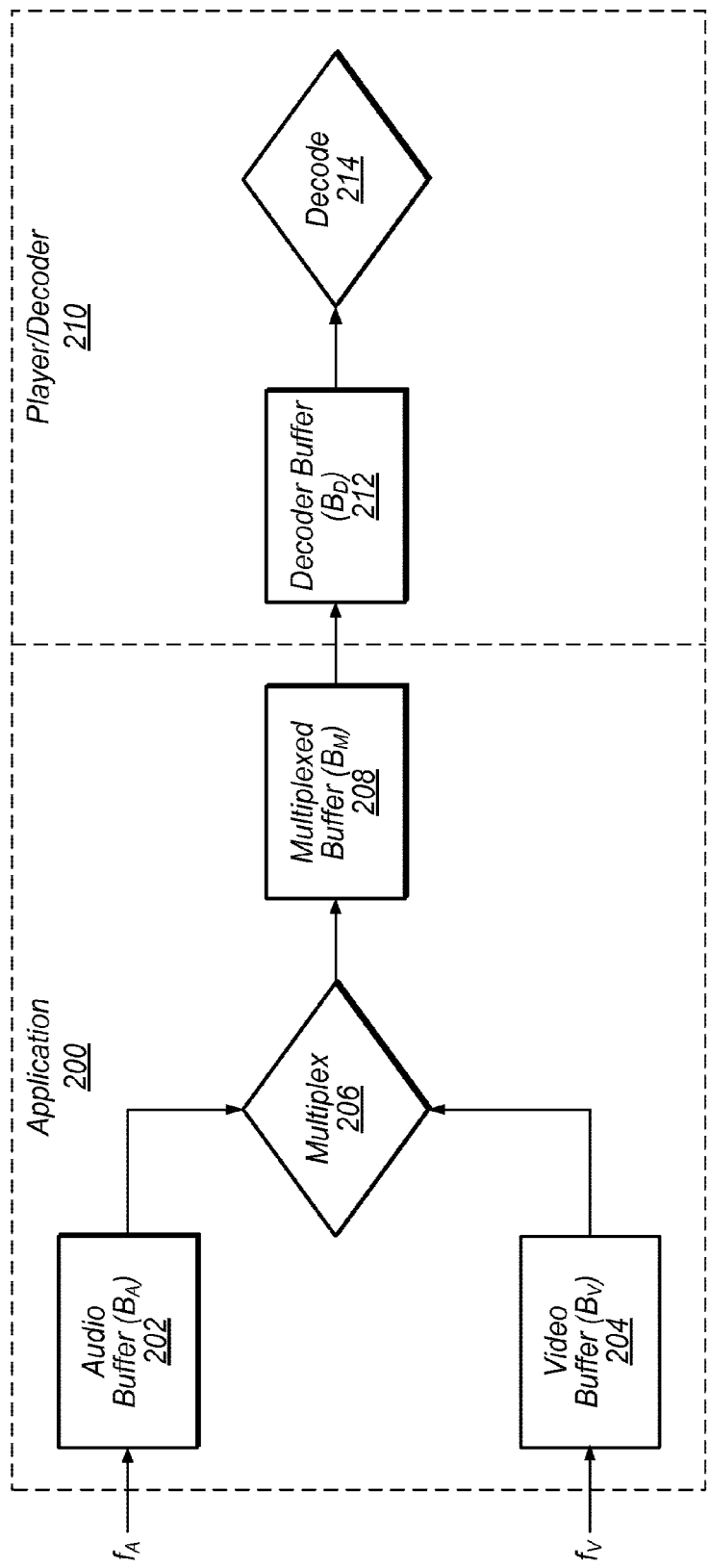
FIG. 2 illustrates an example buffer configuration and data flow among buffers of an application and decoder of a client device, according to at least some embodiments.

FIG. 2 illustrates an example buffer configuration and data flow among buffers of an application and decoder of a device (e.g., client device). As shown, audio buffer ($B_A$) 202, video buffer ($B_V$) 204, multiplex 206, and multiplexed buffer ($B_M$) 208 may reside in application 200, in some embodiments. Also as shown, decoder buffer ($B_D$) 212 and decode 214 may reside in decoder 210, in some embodiments. Table 1 includes definitions and terms used herein.

TABLE 1

| Parameters | Definition |
| --- | --- |
| $B_A$ | The buffer for storing audio fragments |
| $B_V$ | The buffer for storing video fragments |
| $B_M$ | The multiplexed buffer used for stored data after multiplexing data from $B_A$ and $B_V$ |
| $B_D$ | The decoder buffer |
| $B_{XTh}$ | The threshold of $B_X$ to request more data from the upstream buffer or the network. |
| $F_X$ | The size of a fragment in bits |
| r | The rate of movement of data from $B_M$ to $B_D$ in bits/second (bps) |
| $f_X$ | The rate at which $B_X$ is filled up from the network in bps |
| $b_X$ | The bitrate |
| $(B_x)_{Max}$ | The maximum number of bits in buffer $B_x$ during a fragment arrival time |
| J | The network jitter handling capacity, where the network jitter is the variation in network bandwidth, which may be the number of seconds during which data does not arrive for an active HTTP request for media. |
| L | The live latency, or the difference in time between the event and the playback of the frame that captures that event. |
| S | The switching latency, or the difference in time between when the switch was issued and the playback of the first frame of the switched stream. |

For a client using HTTP streaming, the URL stream buffers, audio buffer 202 ($B_A$) and video buffer 204 ($B_V$), may be at the application layer to load data from an HTTP response. Accordingly, the stream buffers may be populated through HTTP requests. Such population may be at rates $f_A$ and $f_V$, respectively. Multiplexed buffer 208 ($B_M$) may be configured to store the audio and video fragments that are multiplexed together at multiplex 206. Multiplexed buffer 208 may also be configured to provide the multiplexed data to decoder buffer 212 ($B_D$), which may be configured to provide the data to decode 214 for playback. In one embodiment, decoder buffer 212 may trigger data movement from multiplexed buffer 208 when data in $B_D$ falls below $B_{DTh}$. Likewise, when data in $B_A$ falls below $B_{ATh}$, $B_A$ may signal an HTTP request to get the next audio fragment. A similar process may occur at $B_V$. For ease of explanation, it may be assumed that all fragments of a particular track (e.g., audio track, video track, alternate audio track, 3D video track, etc.) may be of the same duration. In some embodiments, that may not be the case. Additionally, for ease of explanation in determining the size of the various buffers, it may be assumed that the thresholds $B_{MTh}$ and $B_{DTh}$ to be the same as their maximum size. Under such an assumption, data may be moved in to those buffers from their respective upstream buffers as soon as the data is available. Note that the actual thresholds may be other values than the corresponding buffer's maximum size. In some embodiments, the threshold may be configurable and modifiable.

In one embodiment, the stream buffers in the application layer may be populated with data as soon as the servers/caches respond with bits. Multiplexing of the data in the stream buffers into multiplexed buffer 208 may occur at or approximately at the same time the stream buffers are populated. At the point where one of the stream buffers drops below its respective threshold (e.g., if the stream buffer provides data to multiplex 206 quicker than it receives new data), an HTTP request may be made to fetch the next fragment of the corresponding stream.

In one embodiment, an available alternate track (e.g., a different language audio track, a different bitrate track, etc.) may be available. The term switch may be used to refer to a scenario in which the alternate track is chosen in the midst of the presentation either in response to user input (e.g., selecting a different language) or automatically (e.g., if the connection bandwidth is high enough to support a higher bit rate track). In some embodiments, when a stream switch occurs, one or both stream buffers may be emptied and in one embodiment, the multiplexer buffer may also be emptied. Each fragment may be accompanied by a timestamp which denotes the decoding time for that fragment. The corresponding fragment for the alternate source that contains the last multiplexed timestamp may be determined and an HTTP request may be issued to fetch that fragment.

When a stream switch occurs, the client may play back everything that is in $B_D$. Thus, in one embodiment, $B_D$ may not be flushed upon stream switch. Moreover, in one embodiment, a minimum amount of data from the new bitstream may be present in $B_D$ before playing the new content to be seamless.

The following discussion will detail: example behavior of a buffer when data is added and depleted, an example technique for determining the size of the buffers $B_A$ and $B_V$, and an example technique for determining $(B_M)_A$, which may be defined as the increase in $B_M$ for the time it takes for a full fragment to arrive. The following discussion will also detail: a determination of the increase of data in $B_D$ based on flow rate r from $B_M$ to $B_D$, a determination of maximum buffer sizes based on thresholds of the buffers, and a determination of live latency, jitter handling capacity, and switching latency in terms of the buffers values.

Figure 3:
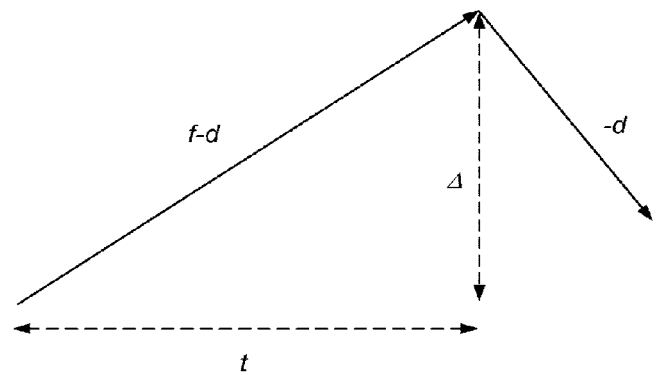
FIGS. 3-4 illustrate example behavior of a buffer, according to some embodiments.

FIG. 3 shows the general behavior of a buffer where the amount of data increases when a fragment is being fetched and decreases by the depletion rate after it arrives completely. For data to flow through for smooth playback, it may be assumed that the accumulation rate α is higher than the depletion rate β. T may denote the time when flow of data into the buffer ceases. The buffer may be drained from that point. The amount of data in the buffer, given by $\Delta$ at time $\tau$ may be given by: $\Delta=(\alpha-\beta)\tau$.

Video and Audio Buffers

In one embodiment, the size of an audio fragment in bits may be $F_A$. Likewise, the size of a video fragment in bits may be $F_V$. Given that the audio fragment of size $F_A$ is fetched at rate $f_A$, the time for an audio fragment to fill audio buffer ($B_A$) 305 from the network may be $$\frac{F_A}{f_A}$$

seconds. Note that $f_A$ and $f_V$ may be the same, in some instances, because they may be defined by the client's bandwidth. In other instances, however, the rates may be different (e.g., if there are 2 separate video sources that come from different web servers having different respective bandwidths).

For simplicity of explanation, let $B_{ATh}$ and $B_{VTh}$ equal zero. In such a scenario, HTTP requests for the respective for fragments may be made when $B_A$ or $B_V$ is empty. $B_M$ may request for multiplexed data to flow into $B_M$ from $B_A$ and $B_V$ as long as data is available to be multiplexed. Data may also continually flow to $B_D$. The buffer sizes $(B_A)_{Max}$ and $(B_V)_{Max}$ of $B_A$ and $B_V$ may be given by:

$$(B_A)_{Max}=F_A$$
$$(B_V)_{Max}=F_V \qquad \text{Eq. (1)}$$

where $F_A$ is the size of the audio fragment in bits and $F_V$ is the size of the video fragment in bits. After the data in audio buffer ($B_A$) 305 reaches $(B_A)_{Max}$, the HTTP request for the next audio fragment may not be issued until the data in audio buffer ($B_A$) 305 depletes to $B_{ATh}$.

Multiplexed and Decoding Buffers

The amount of increase of $B_M$ while a fragment fully arrives may be determined. In one embodiment, a limit may be placed on the maximum number of bits, r, that can be pushed to decoder buffer ($B_D$) 350 every t seconds, such that the multiplexing thread can yield allowing for computing cycles to be used for playback.

In one embodiment, in t seconds, $t \cdot f_A$ bits of audio have arrived resulting in $$\frac{t \cdot f_A}{b_A}$$

seconds of audio, where $b_A$ is the bit rate of the audio. For simplicity sake, let $$\frac{f_V}{b_V} < \frac{f_A}{b_A},$$

although note that sometimes this may not be the case. In one second, the amount of video arriving is $f_V$. This can be multiplexed with $$\frac{f_V}{b_V}$$

seconds of audio. Thus, the amount of audio it may be multiplexed is given by $$\frac{f_V}{b_V} \cdot b_A.$$

Assuming that multiplexing takes a negligible amount of time, in the buffer EM, the rate of inflow of data, $\alpha_M$ and the rate of depletion due to movement to $B_D$, $\beta_M$ is given by:

$$\alpha_M = f_V + \frac{f_V \cdot b_A}{b_V},$$

$$\beta_M = r.$$

The addition of data in $B_M$ goes on for the time it takes for the fragment to fully arrive after which there is no inflow as one or more of the buffers $B_A$ and $B_V$ is empty and there is nothing to multiplex. At this point $\tau_M$, $(B_M)\Delta$ may be determined, as it may decrease due to outflow of data to $B_D$. The fragment arrival time $\tau_M$ may be given by:

$$\tau_M \frac{F_V}{f_V}. \qquad \text{Eq. (2)}$$

$$(B_M)_\Delta = (b_A + b_V)\left(\frac{f_x}{b_x} - \frac{r}{b_A + b_V}\right)\frac{F_x}{f_x}$$

where, $x = A$ if $\left(\frac{f_x}{b_x} < \frac{f_V}{b_V}\right)$ else, $x = V$.

To determine $(B_D)_\Delta$, it is noted that $B_M$ may reach its maximum after $$\frac{F_x}{f_x}$$

seconds. Additionally, the time for $B_M$ to go from $(B_D)_\Delta$ to 0 when no data is flowing is given by:

$$\tau'_M = \frac{(B_M)_\Delta}{r}.$$

The rate of adding to $B_D$ is r bps and the rate of depletion is $(B_A+B_V)$ bps due to playback. Hence, $\alpha_D=r$, $\beta_D=b_A+b_V$.

The total time data continually flows into $B_D$ from $B_M$ after a fragment request is made is given by the time it takes for $B_M$ to reach $(B_M)_\Delta$ in addition to the time it takes for $B_M$ to deplete from $(B_M)_\Delta$ to 0:

$$\tau_D = \tau'_M \Rightarrow \tau_D = \frac{F_x}{f_x} + \frac{(B_M)_\Delta}{r}.$$

$(B_D)_\Delta$ at time $\tau_D$, which may be how much $B_D$ grows after a fragment arrives completely may be determined as:

$$(B_D)_\Delta = (r - (b_A + b_V))\left(\frac{F_x}{f_x} + \frac{(B_M)_\Delta}{r}\right) \qquad \text{Eq. (3)}$$

$$\Rightarrow (B_D)_\Delta = (r - (b_A + b_V))\left(\frac{F_x}{b_x} \frac{(b_A + b_V)}{r}\right)$$

For a steady fill rate f, since the buffers $B_M$ and $B_D$ may keep increasing, limits may be imposed on both the buffers as $(B_M)_{Max}$ and $(B_D)_{Max}$, respectively. This also may help prevent $B_D$ from growing infinitely. For switching to a different audio stream or different bitrate stream, the data in $B_D$ may be played out instead of being flushed. $(B_D)_{Max}$ may also limit the time taken for bitrate switching. If $B_D$ falls below $(B_D)_{Max}$, it may trigger more data flow in from $B_M$. At steadily high fill rate (e.g., for video on demand content), $B_D$ may grow to $(B_D)_{Max}$ and may be maintained at that value. In some scenarios, with bitrate switching, the fill rate may be close to the bitrate of the stream resulting in the operating point of the buffers given by Equations 2 and 3.

Varying r may determine how much data is in $B_D$ versus $B_M$. Data may not move out from $B_M$ faster than the rate it is coming in to $B_M$.

Thresholds

In some embodiments, a call may be issued for the next fragment of audio or data before the audio and video buffers get empty. Accordingly, each of the audio and video buffers may have respective thresholds. Each of the maximums of $B_A$ and $B_V$, from Eq. (1) above, may be incremented by the respective threshold values. Once $B_A$ and $B_V$ reach their threshold values, an HTTP request to get the next fragment may be issued. $B_A$ and $B_V$ buffer sizes may be given by:

$$(B_A)_{Max} = B_{A_{Th}} + F_A$$

$$(B_V)_{Max} = B_{V_{Th}} + F_V \qquad \text{Eq. (4)}$$

Figure 4:
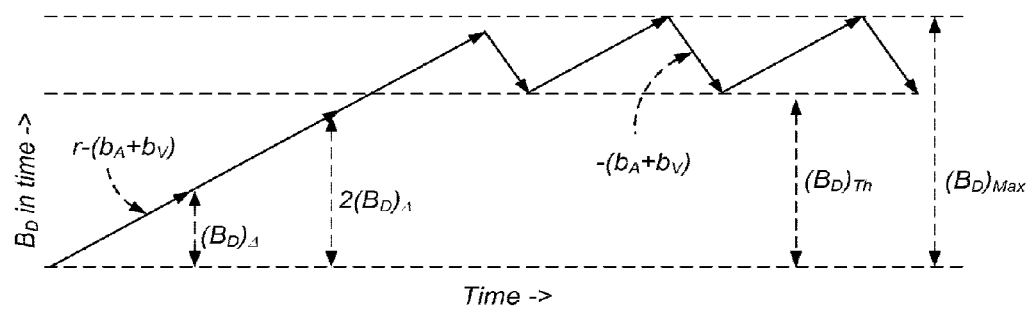

For smooth playback, r may be greater than $b_V + b_A$. From FIG. 4, the behavior of $B_D$ is illustrated with a threshold at $(B_D)_{Th}$. $B_D$ may first grow to $(B_D)_{Th}$ and is then maintained between $(B_D)_{Th}$ and $(B_D)_{Max}$ for unchanged network conditions, with the assumption that the time to multiplex and the time to request a fragment are each negligible. The $B_D$ buffer size may be given by:

$$(B_D)_{Max} = B_{D_{Th}} + (B_D)_\Delta. \qquad \text{Eq. (5)}$$

Once $B_D$ falls below its threshold, it may try to get more data from $B_M$. The instantaneous value of $B_D$ at t seconds after it reaches $(B_D)_{Th}$ may be given by:

$$(B_D)_t \begin{cases} (B_D)_{th} + (r - (b_A + b_V))t, \\ \quad \text{if } 0 < t < \tau_D \\ (B_D)_{th} + (B_D)_\Delta - (b_A + b_V)(t - \tau_D), \\ \quad \text{if } \tau_D < t \leq \tau_D + \tau'D \end{cases}$$

Live Latency

When a fragment is ready in the server, at that point, a latency of one fragment is already generated. After a fragment starts arriving in the client as an HTTP response, in the client system, the bits may flow through the buffers before display. Assuming the frame rate to be $f_r$, the average bits in a frame may be $$\frac{b_V}{f_r}.$$

Then, the time it takes for a frame to pass through the buffers may be given by $t_f$ $$t_f = \left(\frac{1}{f_V} + \frac{1}{r}\right)\frac{b_V}{f_r}.$$

To obtain a minimum latency, each of the buffers should run low, but this may affect jitter handling capacity as discussed below. To prevent the scenario of $B_D$ running below a certain value, a parameter $(B_D)_{Min}$ may be added. $(B_D)_{Min}$ maybe the minimum amount of data required in $B_D$ for playback. Live latency may then be given by:

$$L = \frac{F_V}{b_V} + \frac{b_V}{f_V \cdot f_r} + \frac{b_V}{r \cdot f_r} + (B_D)_{Min}. \qquad \text{Eq. (6)}$$

Note that, for ease of explanation, decoding time and network delay is not shown in Eq. (6). Further note that Eq. (6) only addresses video. A similar live latency may be determined for audio or other content; however, the live latency of video may be worse than audio such that considering audio separately, when video content is also present, may not be necessary.

Jitter Handling

The amount of jitter that can be tolerated by the buffer model may depend on the amount of data present at that instant in the various buffers. The data in $B_M$ and $B_D$ can be played out while the network is experiencing a jitter. Also, the data that can be multiplexed from $B_A$ and $B_V$ at that instant can be pushed to the downstream buffers for playback and hence can absorb jitter. For example, if 4 seconds of data is buffered in the various buffers, then 4 seconds of jitter (e.g., network disruption) can be handled. Thus, the amount that may be handled at a given instant (in seconds) may be:

$$J = \frac{B_M + B_D}{b_A + b_V} + \left(\frac{B_A}{b_A}, \frac{B_V}{b_V}\right)\text{Min}. \qquad \text{Eq. (7)}$$

Note that the jitter handling capacity may decreases if all the buffers run low. So, to prevent it from becoming too low, a parameter $(B_D)_{Min} = \delta$ may be added that represents the minimum amount of data needed in $B_D$ for playback.

Switching Latency

Bitrate switching as well as switching to alternate tracks (e.g., for multiple language tracks, multiple camera angles, etc.) may entail obtaining new fragments while playback of the current bitrate or track is in progress. To ensure smooth playback continuing while the next fragment is being fetched, some data may be present at least in buffer $B_D$ when the switch is made. And, data from the new fragment may arrive before the data present in the buffer is exhausted through playback. To get the minimum switching time, the unmultiplexed data existing in $B_A$, $B_V$ and multiplexed data residing in BM can be flushed out. Note that the maximum switching time may be equal to J in the case when no buffers are flushed while getting the new fragment. Considering that the existing data in $B_A$, $B_V$ can be flushed out in case of a switch, switching time (in seconds) may be defined as:

$$S = \frac{B_D}{b_A + b_V}. \qquad \text{Eq. (8)}$$

Switching Streams Determination

In multi bitrate streaming, there may be multiple bitrates of the content available. If the fill rate is higher than the bitrate, there may be a residual amount of data in $B_M$ and $B_D$ after receiving one fragment completely. To analyze how fast the past fragments were downloaded, a sliding window of $(B_D)_\Delta$ can be maintained to make the decision of switching up or down. Each time the fill rate is higher than the corresponding bitrate, $B_D$ may go up by $(B_D)_\Delta$. If it is consistently high for the sliding window, a decision to switch up can be made. Similarly, if $(B_D)_\Delta$ is low for a series of past fragment downloads in the sliding window, a decision to switch down can be made.

EXAMPLES

Consider the following example using actual numbers with the buffer model of FIG. 2. Let $B_V$=10 Mbps, $b_A$=320 Kbps and fragments to be 2 seconds each. Further, let $F_V$=20 Mb, $F_A$=0.64 Mb and $f_V$=$f_A$=f. The thresholds of $B_A$ and $B_V$ may be set to half a fragment each such that $B_{ATh}$=0.32 Mb and $B_{VTh}$=10 Mb. The maximums of $B_M$ and $B_D$ may be 2 and 8 seconds worth of data, respectively. Accordingly, $(B_M)_{Max}$=2(10+0.32)=20.64 Mb and $(B_D)_{Max}$=8(10+0.32)=82.56 Mb.

From Eq. (4), $(B_A)_{Max}$=0.32+0.64=0.96 Mb and $(B_V)_{Max}$=10+20=30 Mb. For proper playback, the fill rate should be at least the bitrate of the higher bitrate stream among the video and audio (in this case video).

Continuing the example, $(B_M)_\Delta$=10.32 (f/10−r/10.32)*20/f=20.64−20r/f Mb and $(B_D)_\Delta$=(r−10.32)*20*10.32/10r=20.64−213/r Mb. To ensure proper playback, the rate r of filling buffer $B_D$ should be greater than the bitrate $b_A$+$b_V$.

Using actual numbers for r and f, let r=12 Mbps and let f=13 Mbps. Then, $(B_M)_\Delta$=20.64−20*12/13=2.18 Mb and $(B_D)_\Delta$=20.64−213/12=2.89 Mb. $B_M$ starts accumulating some data when the fragment arrives completely. Considering the above values, the switching time at the operating point is obtained from Eq. (8). S=2.89/10.32=0.28 seconds. Since r gives the average rate of transfer form $B_M$ to $B_D$, it may not go beyond f.

Assuming the fragment was dispatched from the server as soon as it was generated, e.g., for a video with 30 frames per second, the latency is given by Eq. (6), L=20/10+10/(13*30)+10/(12*30)+0.1=2.15 seconds. Let $B_{ATh}$ equal half an audio fragment, 0.32 Mb in this example and let $B_{VTh}$ equal half a video fragment, 10 Mb in this example. At a steady fill rate from the network, $B_A$>0.32 Mb and $B_V$>10 Mb. Depending on the threshold values of the other buffers, some part of it is multiplexed and moved to $B_M$ and subsequently to $B_D$. $B_M$ and $B_D$ can grow to their maximum sizes when low bitrate VOD content is played and enough bandwidth is available to supply a steady and high fill rate. Jitter that can be handled when $B_M$ and $B_D$ are at their maximums is given by Eq. (7): J=$(B_D)_{Max}$/10.32+$(B_M)_{Max}$/10.32+(0.32/0.32, 10/10)$_{Min}$=8+2+1=9 seconds.

The illustrated buffer model in FIG. 2 may optimize multiplexing and rendering of video and audio gathered from different sources and may enable buffer sizes to be determined based on any network jitter and live latency requirements. The buffer model may also enable network jitter and live latency requirements to be determined based on buffer size. Given the sizes of the buffers, switching latency, live latency, and network jitter can be determined. Moreover, buffer sizes can be determined given the maximum network jitter the system needs to handle and the maximum switching and live latencies may be computed in the user experience. With such tools available, the buffer sizes may be configurable and designers may make informed decisions unique to specific conditions.

Additionally, by providing on-the-fly late binding multiplexing of content, the client driven buffer model allows the ability for adding language tracks later after the primary audio is published along with the video. Further, the buffer model may be leveraged in making a determination to switch to other bitrates to deliver better performance.

Figure 5:
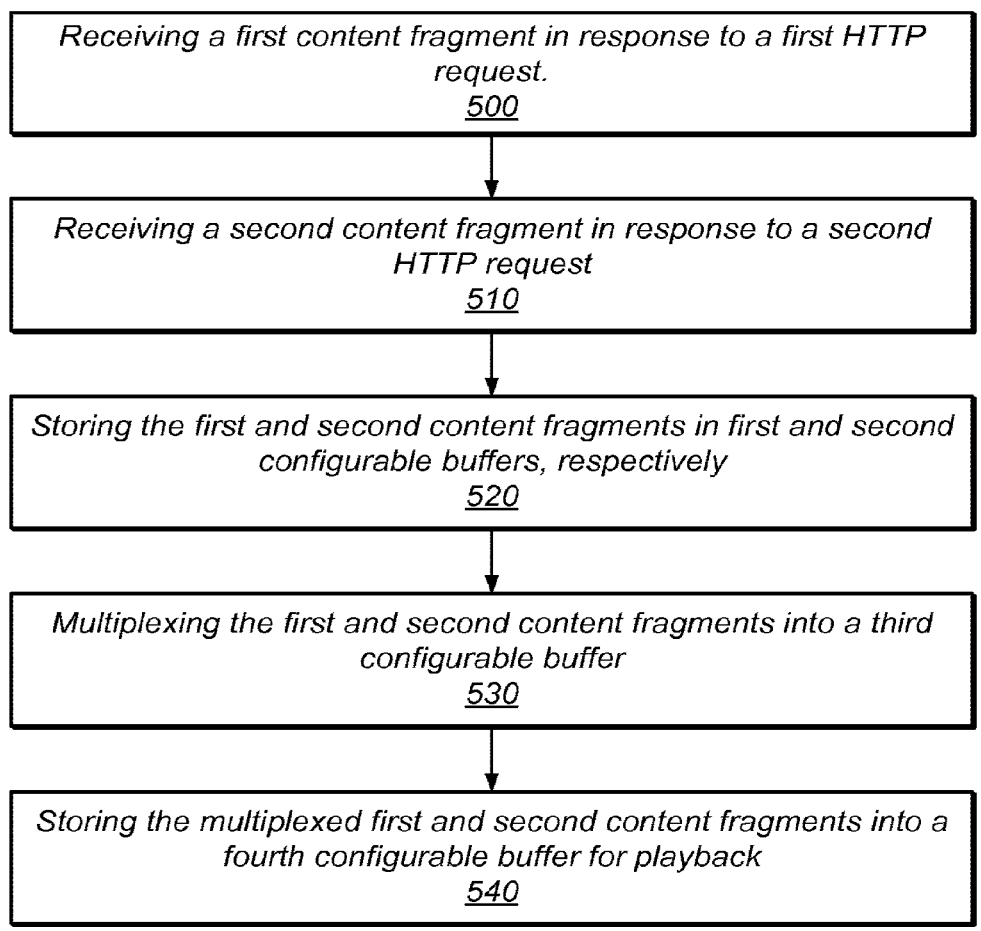
FIG. 5 illustrates a flowchart of an example method for implementing a buffer model in an HTTP streaming client, according to some embodiments.

Turning now to FIG. 5, one embodiment of a method for implementing a buffer model in an HTTP streaming client is illustrated. While the blocks are shown in a particular order for ease of understanding, other orders may be used. In some embodiments, the method of FIG. 5 may include additional (or fewer) blocks than shown. Blocks 500-540 may be performed automatically or may receive user input. In one embodiment, application 200 may implement the method of FIG. 5.

At 500, a first content fragment may be received in response to a first HTTP request. The first content fragment may be a fragment of a first content stream. As one example, the first content stream may be a low bitrate video stream, a high bitrate video stream, a three-dimensional (3D) video stream (low or high bitrate), an audio stream, which may be any one of a number of languages, or any other type of content. Accordingly, in a simple example, the first content stream may be a high bitrate video stream. In such an example, the first content fragment may be a fragment of that video stream. The fragment may be referred to in terms of a size of a fragment, in bits (or bytes) or in terms of transmission time (e.g., 4 seconds worth of data).

As shown at 510, a second content fragment may be received in response to a second HTTP request. Similar to block 500, the second content fragment may be a fragment of a second content stream. As described above at 500, the second content stream may likewise be a low bitrate video stream, a high bitrate video stream, a three-dimensional (3D) video stream (low or high bitrate), an audio stream, which may be any one of a number of languages, or any other type of content. In one embodiment, however, the first content stream may be video or audio based and the second content stream may be the other type of content (video or audio). Continuing the example from block 500, if the first content stream is high bitrate video, then the second content stream may be an English audio stream. Note that stream may also be referred to as a track. Thus, an English audio stream and English track may refer to the same thing.

As shown at 520, the first and second content fragments may be stored in first and second buffers of a plurality of buffers, respectively. In the example implementation of FIG. 5, four buffers are used; however, in other implementations, other numbers of buffers (e.g., 3) may be used. For example, the third and fourth buffers as described herein, may be combined into a single buffer, which may reside in the player/decoder in one embodiment. In one embodiment, the first buffer may be Br, the second buffer may be $B_A$, the third buffer may be $B_M$, and the fourth buffer may be $B_D$, as described herein.

In one embodiment, each of the plurality of buffers is configurable. Examples of ways in which the buffers may be configurable include a threshold value and a size of the buffer. Note that each of the buffers may have its own size and threshold value. For example, the first buffer may have a size of 8 Mb and a threshold of 8 Mb while the second buffer may have a size of 2 Mb and a threshold of 1.5 Mb. The threshold value may be usable by the buffer to determine when to request additional data. Thus, in the case of first and second buffers, if the amount of data presently stored in the buffer is less than the threshold value, an additional HTTP request may be made, resulting in an additional content fragment being received and stored. In the case of the third and fourth buffers, going below the threshold may result in polling for more data, or in some cases, the upstream buffer may monitor an indicator from the downstream buffer that it is ready for additional data. In response, the upstream buffer may provide that additional data to the downstream buffer. As a simple example using the first buffer, as soon as the amount of data goes below 8 Mb, the first buffer may generate another HTTP request for an additional content fragment.

In some embodiments, a size of each of the buffers (first through fourth buffers) may be determined based on a respective threshold value for each buffer. Accordingly, each of the buffers may be configured based on the size determination. For example, it may be determined that the first buffer should be sized at 8 Mb. After such determination, the first buffer may be configured to be 8 Mb.

As illustrated at 530, the first and second content fragments may be multiplexed into a third buffer. As described herein, the multiplexing may be performed in and by an application of a client device. Moreover, in the illustrated embodiment, the first, second, and third buffers are located in the application whereas the fourth buffer is located in the player/decoder. As described herein, multiplexing is a technique for combining multiple content fragments into a single content fragment. In one embodiment, multiplexing includes interleaving the first and second content fragments, but in other embodiments, other techniques may be used as well.

At 540, the multiplexed first and second content fragments may be stored into a fourth configurable buffer for playback. In one embodiment, the multiplexed data from be stored in the fourth buffer from the third buffer at a rate r, as described herein. The rate r may be modifiable, for example, based on a determined latency (e.g., live and/or switching) and/or jitter. In one embodiment, the rater may be throttled such that $B_D$ may not overflow and/or prevent playback from beginning because there may not be enough CPU cycles to perform playback. In one embodiment, r may be at least higher than the bit rate of the video stream. The fourth buffer may then provide the data for playback to a decoder of the player/decoder where the data may be decoded for display.

In one embodiment, one or more of the buffers may be modified. For example, the size of one of the buffers may be modified based on a changed amount of a rate of data addition to the at least one buffer (e.g., $(B_M)_\Delta$, $(B_D)_\Delta$), and/or it may be based on desired latency and/or jitter handling capacity.

In one embodiment, jitter handling capacity of the client HTTP streaming system may be determined. Such determination may be based on an amount of data present in the plurality of buffers. Likewise, a switching latency and/or live latency may also be determined. For instance, in one embodiment, a switching latency may be based on data present in the fourth buffer. It may also be based on a bit rate of each of the first and second content streams. In various embodiments, the configuration of one or more of the buffers may be modified based on the determined latency and/or jitter. For example, one or more buffers may be sized differently or may have its threshold value changed based on a latency and/or jitter that is considered not acceptable (e.g., by a user and/or automatically by the application). For instance, if buffers are too big, then switching latency might be too large; similarly, if buffers are too small, jitter handling may be poor. As one example, if jitter tolerance is too low (e.g., based on user input or automatically detected and/or determined), then the thresholds for $B_A$ and/or $B_V$ may be increased.

In some embodiments, it may be determined that the first or second content stream/track should be switched to a different content stream. Such a determination may be automatic (e.g., based on bitrate) or it may be in response to user input (e.g., choosing a different language track). After such determination, the stream buffers (e.g., first and second buffers) may be emptied and in one embodiment, the third buffer may also be emptied. A different content fragment from the different content stream may then be received in response to an HTTP request for that different content fragment. The data in the fourth buffer may be played out until the data from the previously selected track is gone. In one embodiment, if an entirely different content stream is selected (e.g., different audio and video tracks), the buffer calculations may be repeated anew without necessarily using the previous calculations as a starting point from which to modify.

Example Results

The following discussion details various example scenarios and their effects on the jitter handling capacity and the switching time. In these example implementations, the multiplexing is done on an as-needed basis eliminating the need of maintaining a growing $B_M$ buffer. Instead, the data available for multiplexing from $B_V$ and $B_A$ is multiplexed and pass to the $B_D$ buffer sequentially, before yielding to the rendering thread. The instantaneous rate of transfer is higher but after sending a burst of data, data is not sent to $B_D$ for some amount of time to maintain the rate r.

The buffer values may be considered in time instead of bits, for easier comparison with the graphs presented in FIGS. 6-10. A stream was used with $b_V$=2.4 Mbps, $b_A$=120 Kbps, and fragments were approximately 4 seconds each. $F_V$ thus equal 8.8 Mb and $F_A$ equals 480 Kb. The bandwidth was throttled to 6 Mbps using bandwidth limiter software. Fill rates $f_A$ and $f_V$ were each equal to 6 Mbps. The thresholds $(B_A)_{Th}$=1 second, and $(B_V)_{Th}$=1 second were used throughout.

Figure 6:
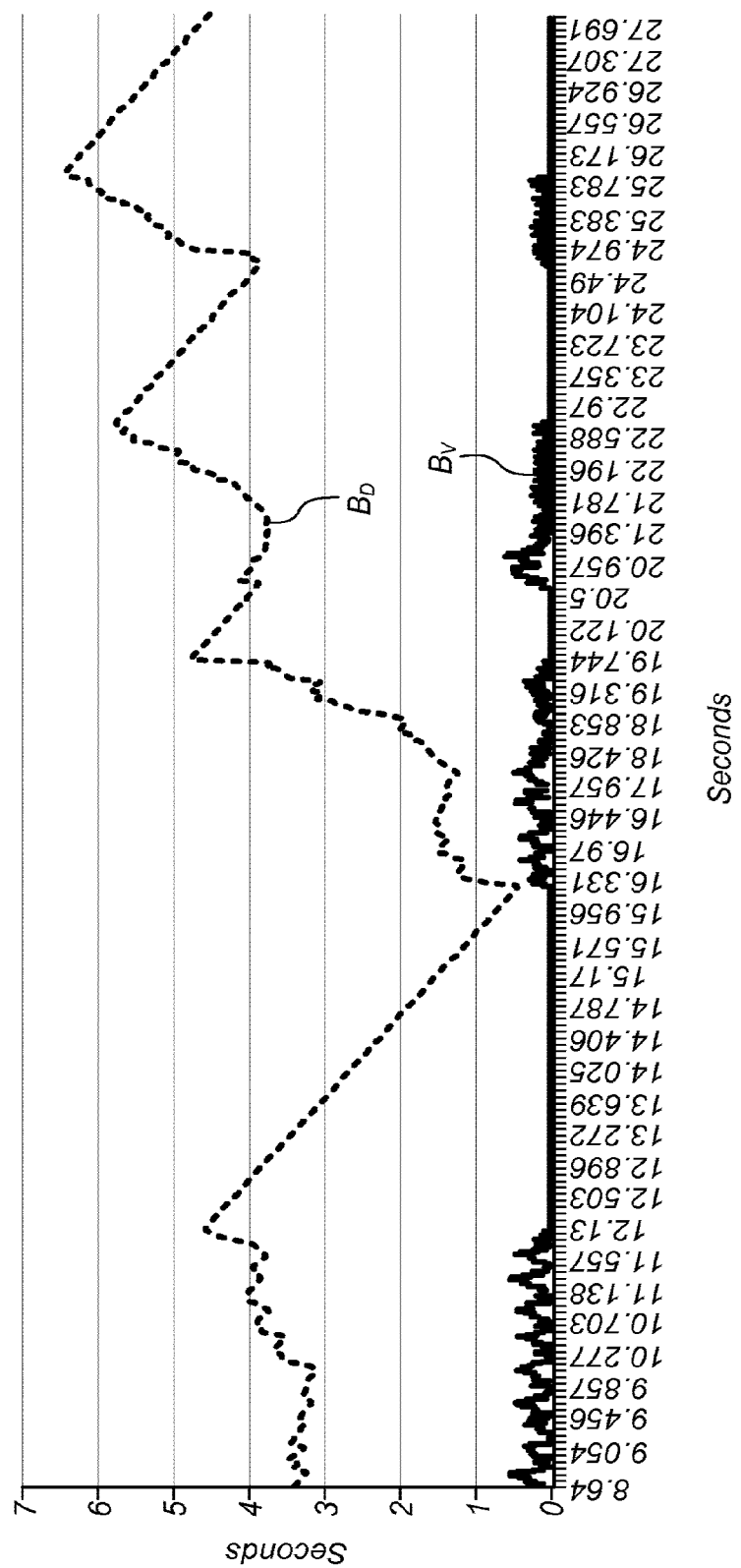
FIGS. 6-10 illustrate results for an example system that implements the disclosed buffer model.

FIG. 6 shows that an increase of the threshold of $B_D$ may increase the jitter handling capacity. Here, a jitter of 4 seconds is tolerated at the 15th second where $B_D$ has enough data to playback and recover in time without stalling. From Equation (4), $(B_A)_{Max}$=1+4=5 seconds and $(B_V)_{Max}$=1+4=5 seconds. Letting r=6 Mbps, Equation (3) yields $(B_D)_\Delta$=5.8 Mb. From Equation (5), $(B_D)_{Max}$=4+2.33=6.33 seconds. Then, from Equation (7), J=>4 seconds.

Figure 7:
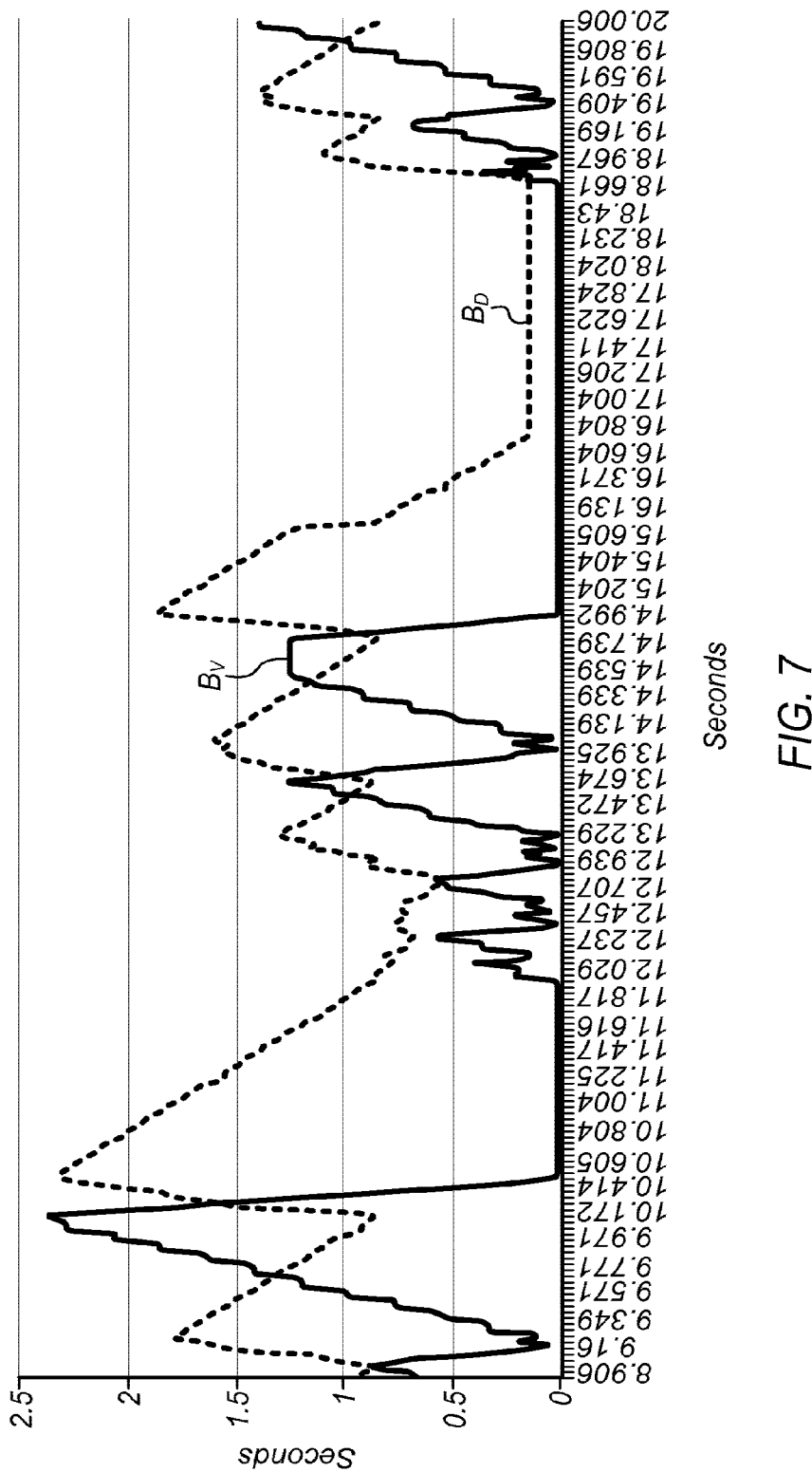

In the example of FIG. 7, $(B_D)_{Th}$ was changed to 1 second. FIG. 7 shows a jitter of 2 seconds occurs at the 10th second and $B_D$ recovers in time without stalling, but in the 15th second, a jitter of 4 seconds cannot be recovered in time as En drops to $(B_D)_{Min}$=0.01 seconds. $(B_D)_{Max}$ may be computed as 3.33 seconds and the jitter may be calculated as J=1.8+0 seconds.

Figure 8:
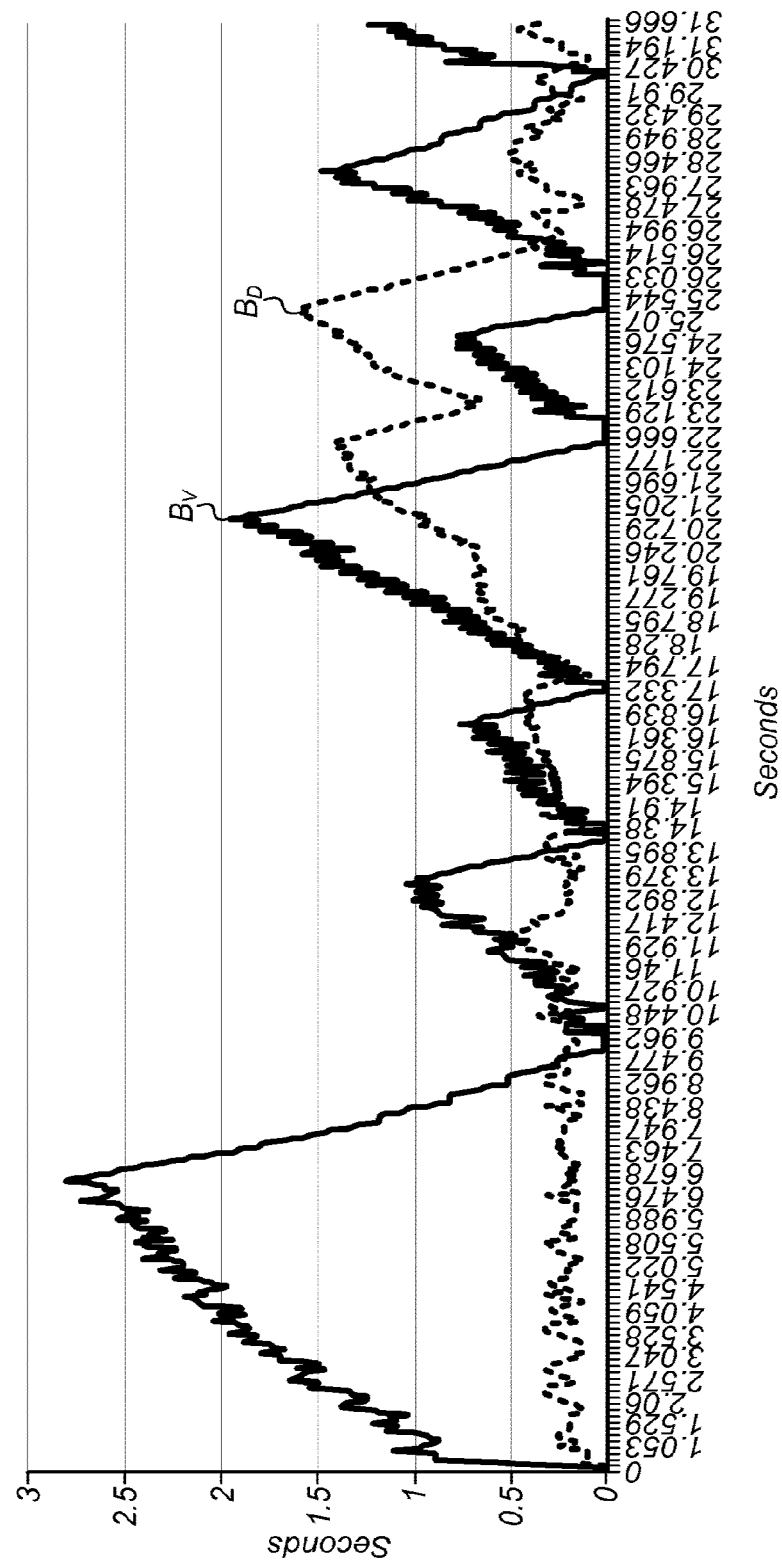
Figure 9:
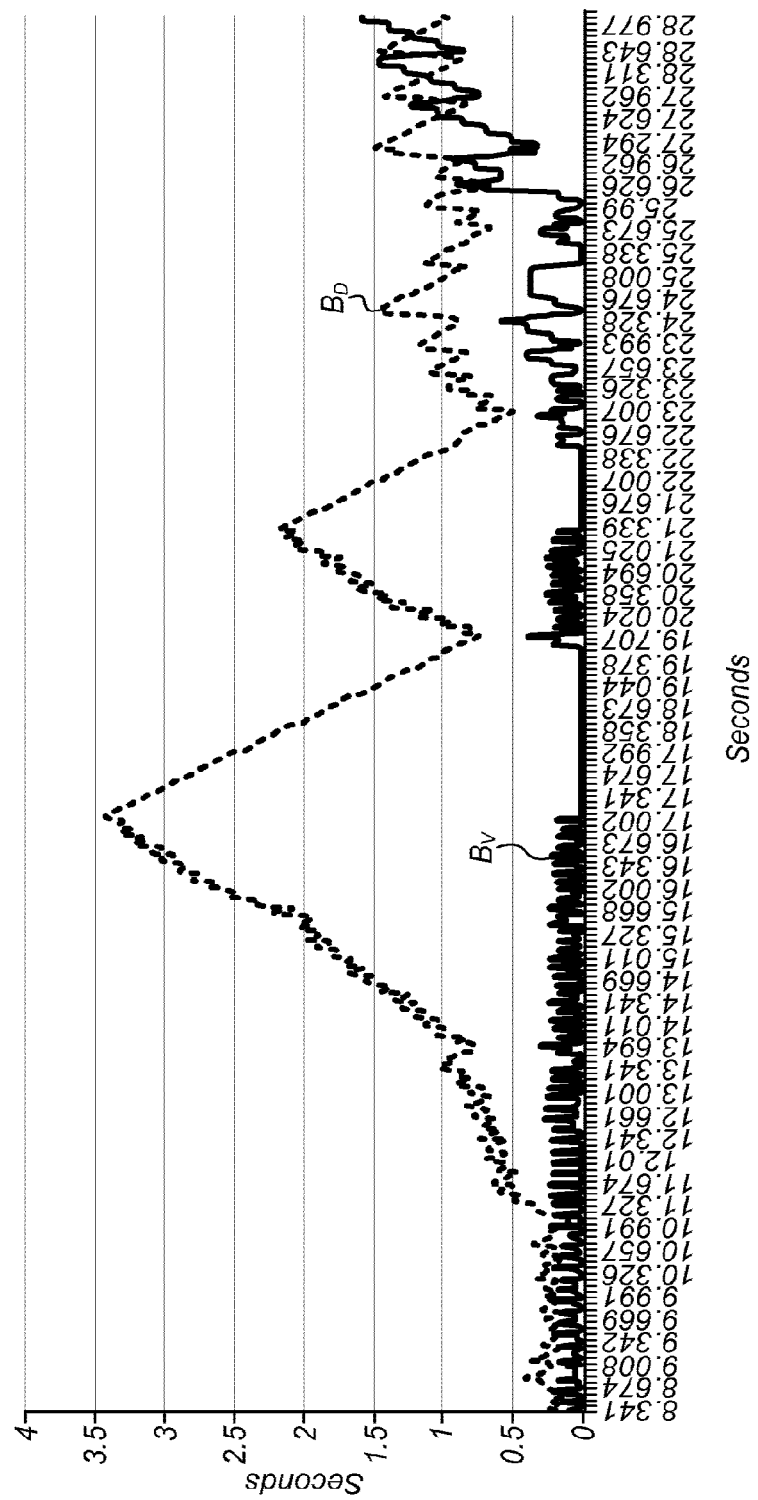
Figure 10:
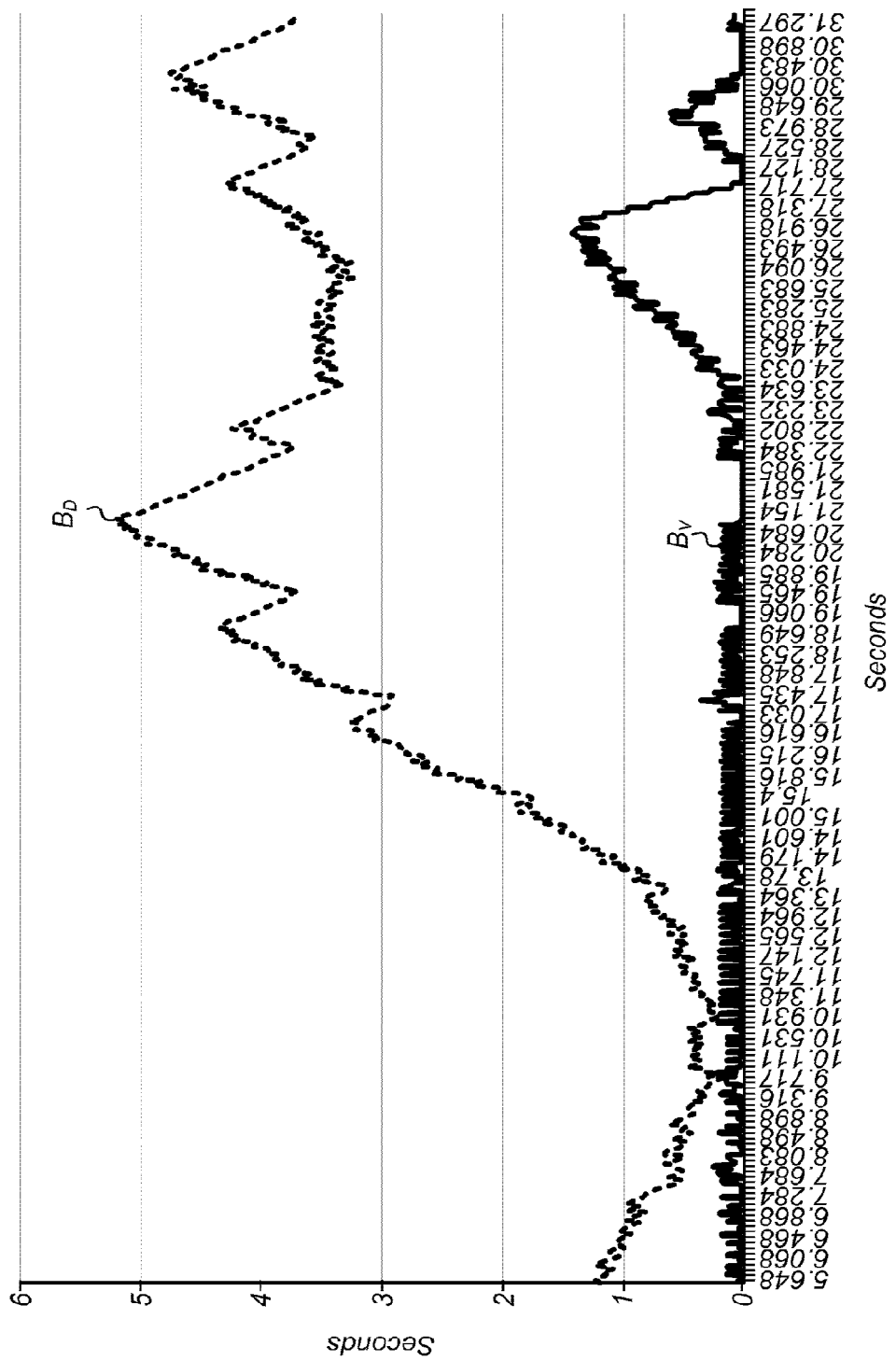

FIGS. 8-10 show how bitrate switching time, S, is affected by the r and $(B_D)_{Th}$. The switching time can be generalized to other track switches (e.g., other language track) as well. Note that for ease of illustration, the values of $B_A$ are not shown as typically audio fragments are downloaded very quickly.

In FIG. 8, an r of 3.2 Mbps and a $(B_D)_{Th}$ of 1 were used. The initial network bandwidth used was also 3.2 Mbps, with the bandwidth being increased to 4 Mbps at the 10th second. At this point, it can be seen that $B_D$ increases faster. Note that the increase in $(B_D)_\Delta$ can be used in a determination on switching to the higher rate stream. At the 25th second, the 2.5 Mbps stream is switched to the next highest available bitrate of 3 Mbps, and the switch time is less than 1 second. The fragment sizes vary as 3 and 6 second fragments. The first bitrate stream that was used had $b_V$=2.5 Mbps, $b_A$=120 Kbps and fragments being approximately 3 seconds each. Then, $F_V$ and $F_A$ each equal 3 seconds. The bandwidth was throttled to 3.2 Mbps making $f_V$ and $f_A$ each equal to 3.2 Mbps.

In the example of FIG. 8, from Equation (3), $(B_D)_\Delta$=1.46 Mb=0.56 seconds. Note that the switch to the higher bitrate at 26.3 seconds is at a trailing slope of $B_D$. A 3 second fragment was requested at 22.9 seconds. The time elapsed between the switch and the last fragment request is: t=26.3−22.9=3.4 seconds. Next, the value of $B_D$ may be derived. From Equation (2), $(B_M)_\Delta$=0.7 seconds. ID is then determined as 2.1 seconds. The instantaneous value of $B_D$ at 3.4 seconds is then given by: $(B_D)3.4$=1+0.56−(3.4−2.1)=0.32 seconds. S may then be determined as 0.32 seconds. This is shown in FIG. 8 where the value of $B_D$ at 2.6 seconds is about 0.3 seconds.

In FIG. 9, the value of r was increased to 20 Mbps while keeping $(B_D)_{Th}$ at 1 second. Note that the bandwidth throttler throttled the rate to 3.2 Mbps. The example starts by playing a 2.5 Mbps stream. Network bandwidth then changes from 3.2 to 4 Mbps at the 10th second. At 21.4 seconds, the stream is switched from 2.5 to 3 Mbps resulting in a switch time of almost 2 seconds. Note that since r was higher than the network bandwidth both before and after switching, r may be replaced by the network bandwidth. Also note that the increase of r kept $B_D$ at higher levels than in the example of FIG. 8. After the switch, r=f=4 Mbps. At 19.6 seconds, a fragment call was issued and data may be seen as coming in to $B_V$ at that point. At 21.4 seconds, a switch is issued. Then, in the time span from 21.4−19.6=1.8 seconds, $(B_D)_{1.8}$=1+(4−2.6)/2.5*1.8=2 seconds. Therefore, from Equation (8), the switching time S is determined as 2 seconds, which can be seen in FIG. 9 where the value of $B_D$ at 21.4 seconds is about 2 seconds.

In FIG. 10, $(B_D)_{Th}$ was increased to 4 seconds while r was 3.2 Mbps. The network bandwidth changed from 3.2 to 4 Mbps at the 10th second. As in the previous example, the current stream was switched from 2.5 to 3 Mbps at the 21st second. The resulting switching time is nearly 5 seconds. Note that just before the 23rd second, a request for a fragment of the lower bitrate was made. So $B_D$ was nearly at $(B_D)_{Th}$. From Eq. (8), S=5 seconds.

Example System

Figure 11:
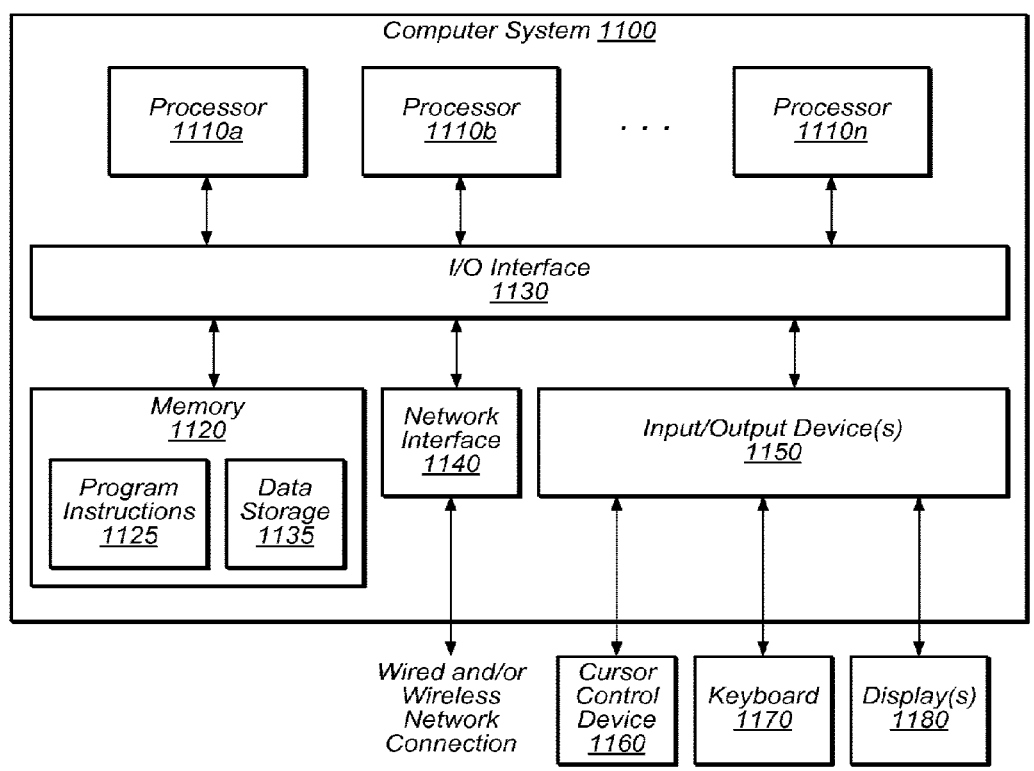
FIG. 11 illustrates an example computer system that may be used in embodiments.

Embodiments of the methods for implementing the buffer model for HTTP streaming as described herein may be executed on one or more computer systems, which may interact with various other devices. One such computer system is illustrated by FIG. 11. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some embodiments, display(s) 1180 may be touch- or multitouch-enabled. In some embodiments of computer system 1100, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments, processors 1110 may be general-purpose or embedded processors implementing any of a variety of instruction set architectures (ISAs), such as the x86, Power PC, SPARC, or MIPS ISAs, or any other suitable ISA. In multiprocessor systems, each of processors 1110 may commonly, but not necessarily, implement the same ISA.

In some embodiments, at least one processor 111 0 may be a graphics processing unit. A graphics processing unit or GPU may be considered a dedicated graphics-rendering device for a personal computer, workstation, game console or other computing or electronic device. Modem GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the buffer model methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1120 may be configured to store program instructions and/or data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the methods for implemented a buffer model for HTTP streaming, are shown stored within system memory 1120 as program instructions 1125 and data storage 1135, respectively. In other embodiments, program instructions and/or data may be received, sent or stored upon different types of computer-accessible media or on similar media separate from system memory 1120 or computer system 1100. Generally speaking, a computer-accessible medium may include storage media or memory media such as magnetic or optical media, e.g., disk or CD/DVD-ROM coupled to computer system 1100 via I/O interface 1130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1140.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. In addition, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network, such as other computer systems, or between nodes of computer system 1100. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computer system 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1125, configured to implement embodiments of the methods for implementing the disclosed buffer model for HTTP streaming as described herein, and data storage 1135, comprising various data accessible by program instructions 1125. In one embodiment, program instructions 1125 may include software elements of embodiments of the methods for implementing the disclosed buffer model for HTTP streaming as illustrated in the above Figures. Data storage 1135 may include data that may be used in embodiments. In other embodiments, other or different software elements and data may be included.

Those skilled in the art will appreciate that computer system 1100 is merely illustrative and is not intended to limit the scope of the methods for implementing the disclosed buffer model for HTTP streaming as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, smart phones, pad devices, tablet devices, pagers, a consumer device, video game console, handheld video game device, application server, storage device, a peripheral device such as a switch, modem, router, or in general any type of computing or electronic device. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method implemented by a computing device, the method comprising:
storing, by the computing device and responsive to receiving a first HTTP (Hypertext Transfer Protocol) request, a first fragment in a first buffer;
storing, by the computing device and responsive to receiving a second HTTP request, a second fragment in a second buffer;
multiplexing, by the computing device, the first and second fragments into a third buffer, the third buffer being configured to output the first and second fragments to a fourth buffer for decoding and playback;
determining threshold values for the first, second, third, and fourth buffers; and
using at least one threshold value for the first, second, third, or fourth buffers to trigger the first HTTP request and the second HTTP request and to address a network change that affects playback of the multiplexed first and second fragments.

2. The method of claim 1, wherein the threshold values for the first, second, and third buffers are configurable to affect latency or jitter handling capacity.

3. The method of claim 1, further comprising determining a size of at least one of the first, second, and third buffers based at least in part on a respective threshold value.

4. The method of claim 1, further comprising modifying at least one threshold value based at least in part on a determined latency.

5. The method of claim 1, further comprising using the threshold value for the fourth buffer to determine when the multiplexed audio and video fragments are moved from the third buffer to the fourth buffer.

6. The method of claim 1, further comprising using the threshold value for the third buffer to determine when to multiplex the audio and video fragments from the first and second buffers, respectively.

7. The method of claim 1, further comprising using the threshold value for the second buffer to determine when to send an HTTP request for an additional fragment for storage in the second buffer.

8. The method of claim 1, further comprising using the threshold value for the first buffer to determine when to send an HTTP request for an additional fragment for storage in the first buffer.

9. A method implemented by a computing device, the method comprising:
determining, by the computing device, threshold values associated with a first buffer storing an audio fragment and a second buffer storing a video fragment;
multiplexing, by the computing device, the audio and video fragments into a third buffer at a bitrate that depends on the threshold values of the first and second buffers;
triggering, by the computing device, movement of the audio and video fragments from the third buffer to a fourth buffer using a determined threshold value of the fourth buffer, the fourth buffer being configured to provide the audio and video fragments for playback; and
triggering HTTP (Hypertext Transfer Protocol) requests for additional audio and video fragments using the threshold values of the first and second buffers, the audio and video fragments stored responsive to receiving a first HTTP request for the audio fragment and a second HTTP request for the video fragment.

10. The method of claim 9, wherein the first, second, and third buffers are configurable to affect latency and jitter handling capacity.

11. The method of claim 9, further comprising affecting latency or jitter handling capacity during playback of the first and second fragments based at least in part on modifying one or more of the determined threshold values.

12. A buffer model comprising:
a first buffer configured to store an audio fragment in response to receiving a first request;
a second buffer configured to store a video fragment in response to receiving a second request;
a third buffer configured to store multiplexed audio and video fragments;
a fourth buffer configured to output the multiplexed audio and video fragments for playback; and
an application configured to:
determine a size and a threshold value of at least one of the buffers;
modify the determined size and the determined threshold value of the at least one buffer to address a network change that affects playback of the multiplexed audio and video fragments; and
determine when to trigger the first request and the second request based on the threshold value of at least one of the buffers.

13. The buffer model of claim 12, wherein the network change that affects playback of the multiplexed audio and video fragments includes jitter.

14. The buffer model of claim 12, the application being further configured to receive an additional audio fragment or an additional video fragment based at least in part on one or more of the determined threshold values.

15. The buffer model of claim 12, wherein the buffer model is included in a client device.

16. The buffer model of claim 12, wherein the application includes an application layer framework built on top of a decoder to serve as an HTTP (Hypertext Transfer Protocol) streaming client.

17. The buffer model of claim 12, further comprising using a threshold value for the fourth buffer to determine when the multiplexed audio and video fragments are moved from the third buffer to the fourth buffer.

18. The buffer model of claim 12, further comprising using a threshold value for the third buffer to determine when to multiplex the audio and video fragments from the first and second buffers, respectively.

19. The buffer model of claim 12, further comprising using a threshold value for the second buffer to determine when to send a request for an additional fragment for storage in the second buffer.

20. The buffer model of claim 12, further comprising using a threshold value for the first buffer to determine when to send a request for an additional fragment for storage in the first buffer.

* * * * *